W. SHAW.
ELECTRODE THREADING APPARATUS.
APPLICATION FILED SEPT. 11, 1916.
1,308,302.
Patented July 1, 1919.
6 SHEETS—SHEET 1.
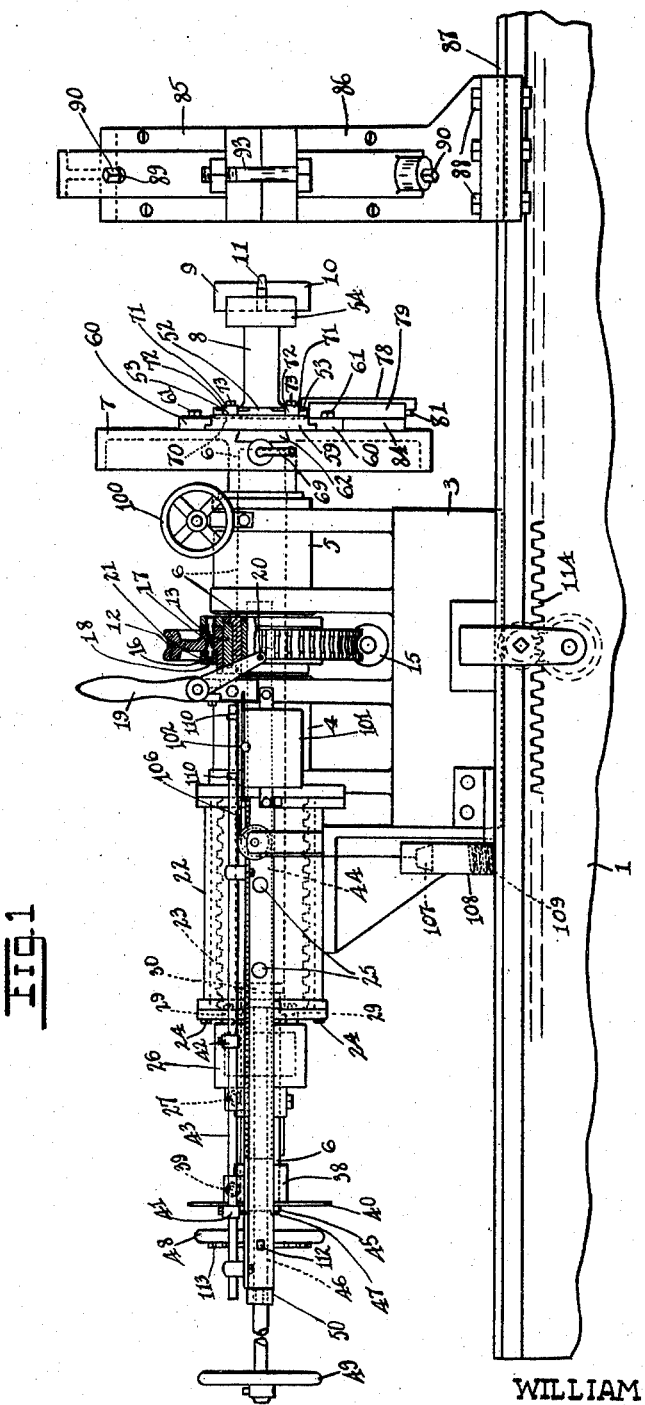
INVENTOR.
WILLIAM SHAW
BY Ira J Adams
ATTORNEY

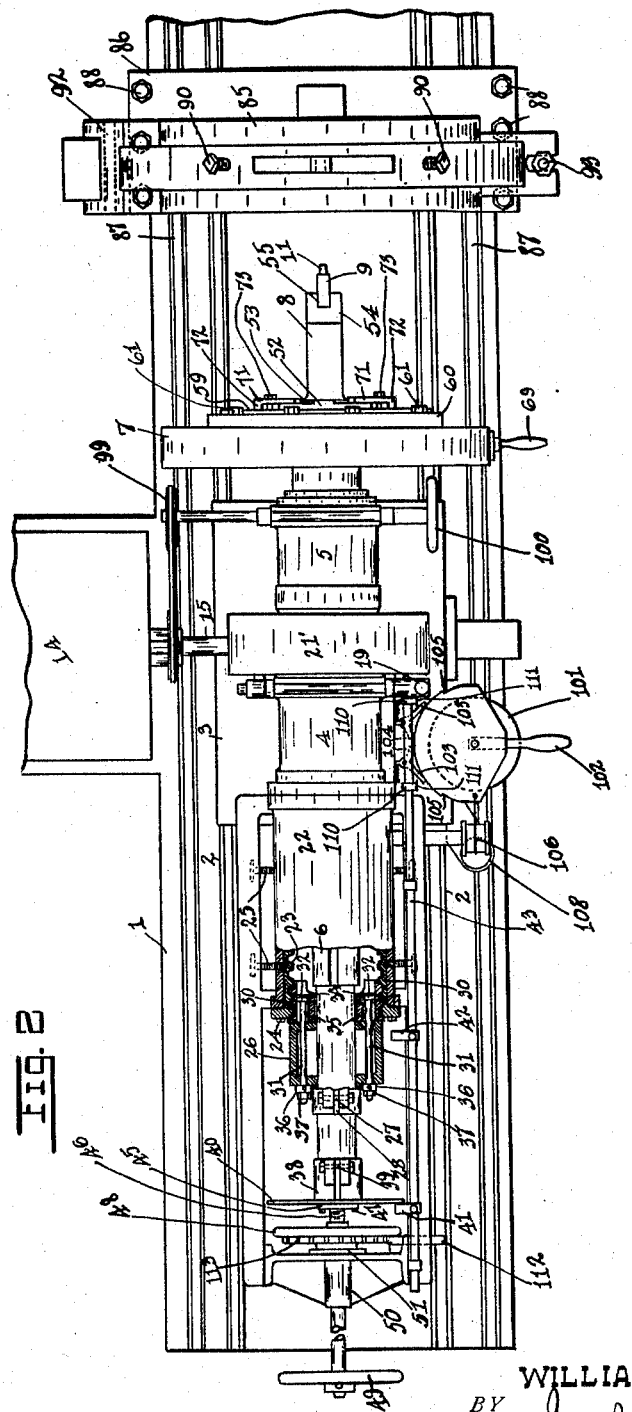

W. SHAW.
ELECTRODE THREADING APPARATUS.
APPLICATION FILED SEPT. 11, 1916.
1,308,302.
Patented July 1, 1919.
6 SHEETS—SHEET 3.
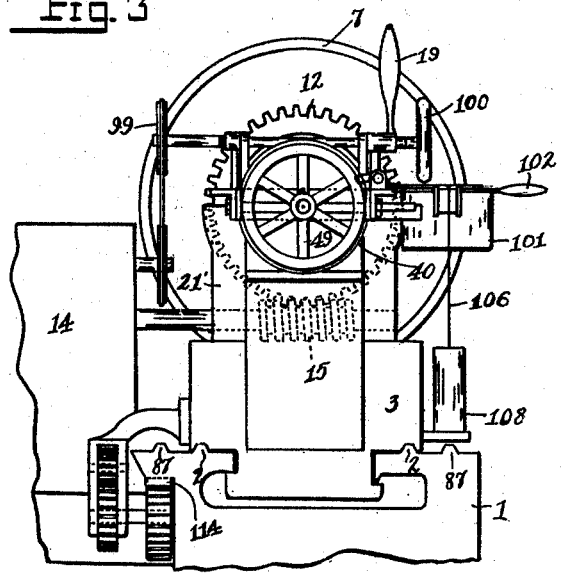
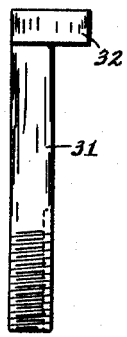
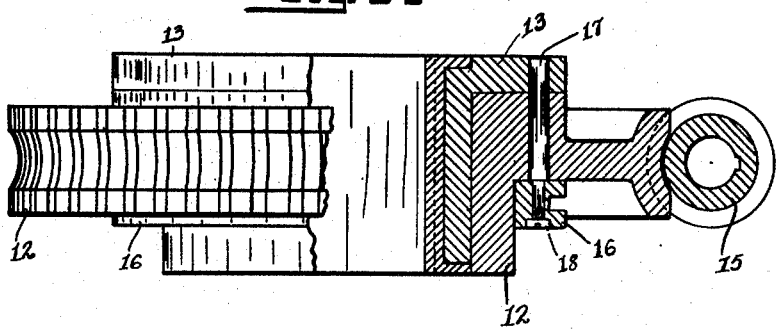
INVENTOR.
WILLIAM SHAW
BY Ira J Adams
ATTORNEY W. SHAW.
ELECTRODE THREADING APPARATUS.
APPLICATION FILED SEPT. 11, 1916.
1,308,302.
Patented July 1, 1919.
6 SHEETS—SHEET 4.
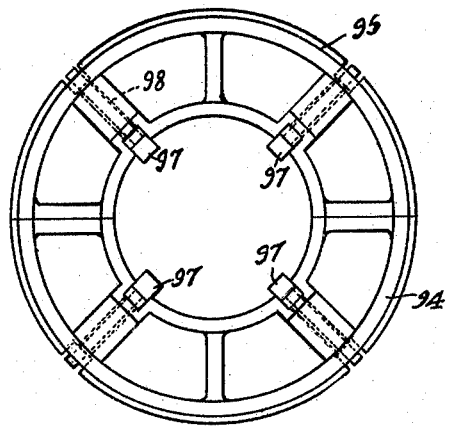
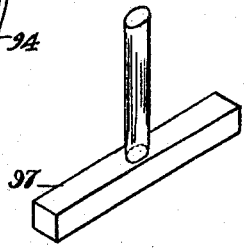
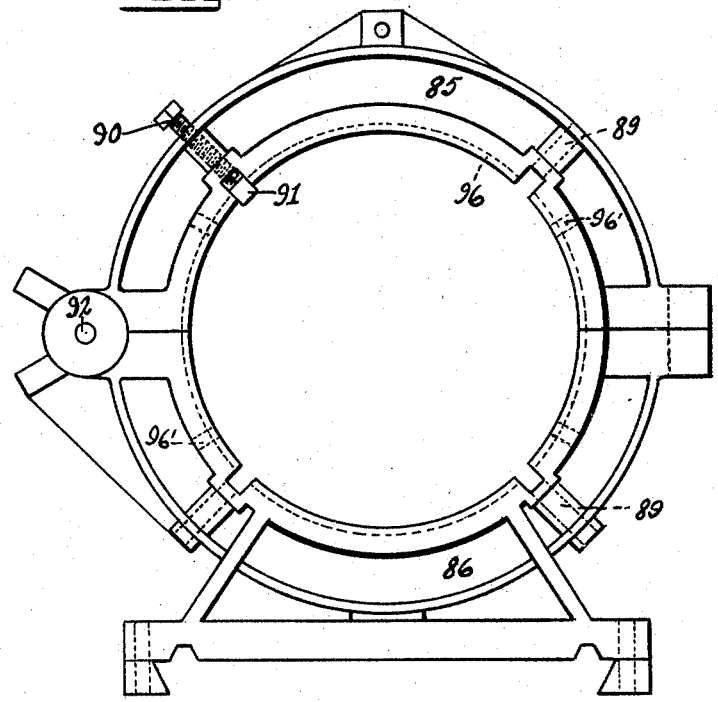
INVENTOR.
WILLIAM SHAW
BY Ira J Adams
ATTORNEY W. SHAW.
ELECTRODE THREADING APPARATUS.
APPLICATION FILED SEPT. 11, 1916.
1,308,302.
Patented July 1, 1919.
6 SHEETS—SHEET 5.
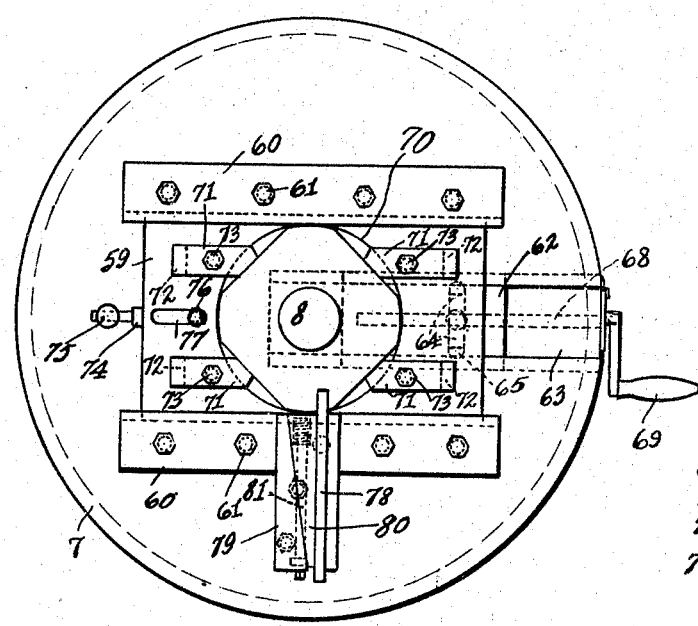
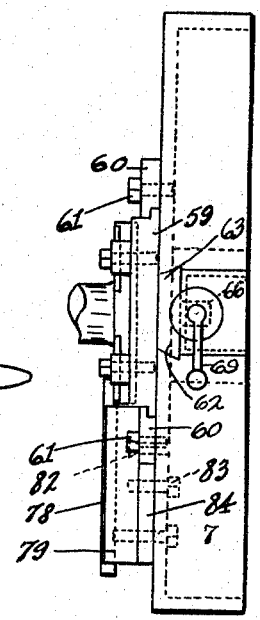
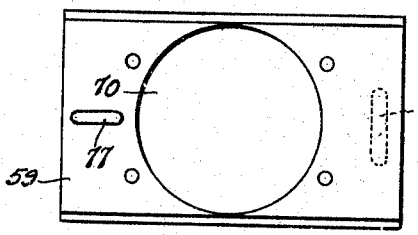
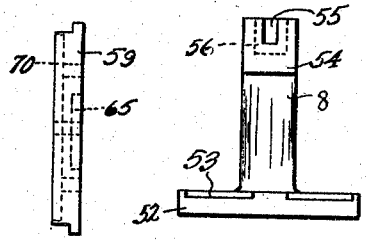
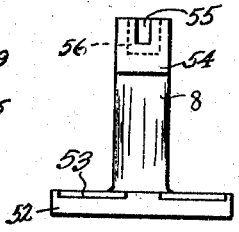
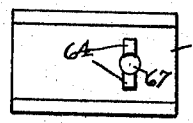
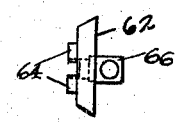
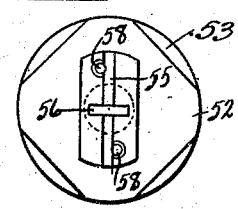
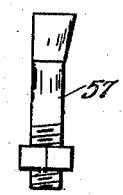
INVENTOR.
WILLIAM SHAW
BY
*Ira J Adams*
ATTORNEY W. SHAW.
ELECTRODE THREADING APPARATUS.
APPLICATION FILED SEPT. 11, 1916.
1,308,302.
Patented July 1, 1919.
6 SHEETS—SHEET 6.
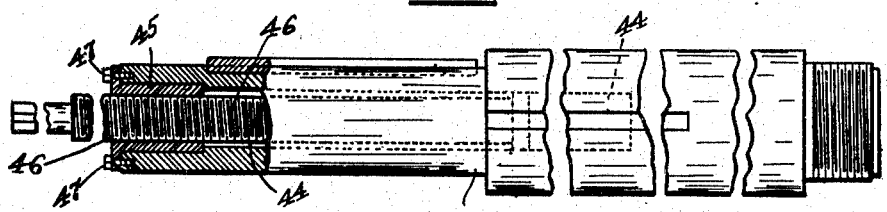
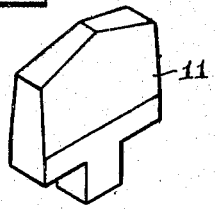
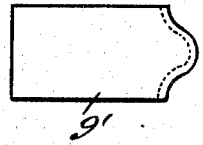
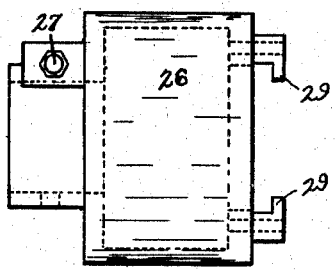
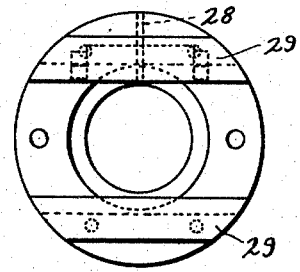
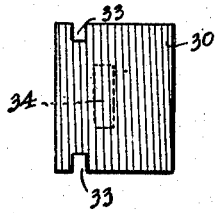
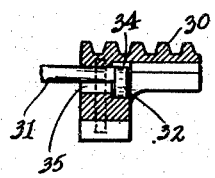
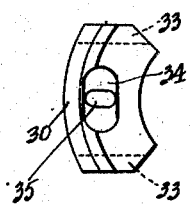
INVENTOR.
WILLIAM SHAW
BY
Ira J Adams
ATTORNEY

UNITED STATES PATENT OFFICE.

WILLIAM SHAW, OF LAKEWOOD, OHIO, ASSIGNOR, BY MESNE ASSIGNMENTS, TO NATIONAL CARBON COMPANY, INC., A CORPORATION OF NEW YORK.

ELECTRODE-THREADING APPARATUS.

1,308,302. Specification of Letters Patent. Patented July 1, 1919.

Application filed September 11, 1916. Serial No. 119,350.

*To all whom it may concern:*

Be it known that I, WILLIAM SHAW, a subject of the King of Great Britain, residing at Lakewood, in the county of Cuyahoga and State of Ohio, have invented a certain new and useful Improvement in Electrode-Threading Apparatus, of which the following is a full, clear, and exact description.

This invention relates to apparatus for forming threaded connections on carbon electrode sections to permit the sections to be threaded together. While it is possible to form a threaded projection on one electrode and mesh the same with an internally threaded socket in the other, it is preferable to form the ends of all the sections with an internally threaded socket. To join two sections together a short threaded dowel is then screwed into the threaded sockets of the electrodes. The apparatus disclosed herein will therefore be described in connection with the making of internally threaded sockets in electrodes, though it could be adapted to externally threaded projecting members if preferred.

Referring to the drawings:

Figure 1 is an elevation of one end of the threading apparatus.

Fig. 2 is a plan view of a portion of the apparatus shown in Fig. 1.

Fig. 3 is an end view of the apparatus shown in Fig. 1.

Fig. 4 is an elevation of the electrode holder.

Fig. 5 is an elevation of an electrode holder bushing.

Fig. 6 is a view of the T clamp used in the bushing shown in Fig. 5.

Fig. 7 is an elevation of the face plate.

Fig. 8 is an end view of the face plate of Fig. 7.

Fig. 9 is a plan view of the boring head slide.

Fig. 10 is an end view of the slide shown in Fig. 9.

Fig. 11 is a plan view of a further slide fitting beneath the slide shown in Fig. 9.

Fig. 12 is an end view of the slide shown in Fig. 11.

Fig. 13 is an elevation of the boring head.

Fig. 14 is a plan of the boring head shown in Fig. 13.

Fig. 15 is a view of the tool clamping bolt of the boring head.

Fig. 16 is a view of the pilot tool.

Fig. 17 is a view of the threading tool.

Fig. 18 is a view of the main shaft of the apparatus.

Fig. 19 is a side view of the collar secured to the main shaft.

Fig. 20 is an end view of the collar shown in Fig. 19.

Fig. 21 is a plan view of the follower.

Fig. 22 is a side view of the follower shown in Fig. 21.

Fig. 23 is an end view of the follower of Fig. 21 with the cam bolt removed.

Fig. 24 is a view of the cam bolt for adjusting the follower of Fig. 21.

Fig. 25 is a sectional view of the driving worm and clutch arrangement.

The electrode threading apparatus or lathe is adapted to bore and thread internally both ends of the electrode section simultaneously. The left hand end of the threading apparatus is the only one that is shown on the drawing, but it will be understood that the threading mechanism on the right hand end of the lathe will be an exact duplicate of that shown and described.

Referring to Figs. 1, 2 and 3, a stationary lathe bed 1 has a pair of parallel V guides 2 (Fig. 3) adapted to fit in similarly shaped ways of the lathe head 3 which is adapted to slide thereon. The slidable head referred to consists, broadly speaking, of suitable bearings 4 and 5 adapted to receive the main shaft 6 (Fig. 18) which is adapted to slide longitudinally in the bearings to produce the desired movement for threading the electrodes. A face plate 7 is secured to the main shaft 6 and carries a boring head 8 adapted to receive various shaped cutting tools. In Fig. 1 the tools 9 and 10 are adapted to bore the hole in the electrode while tool 11 is a pilot device for centering the boring device.

A worm driving wheel 12 is adapted to rotate on a bushing 13 which fits between bearings 4 and 5 and is splined on main drive shaft 6. An electric motor 14 shown more or less diagrammatically in Fig. 3 is supported on a projection of the head stock 3 and drives the worm wheel 12 through the worm 15. A positive clutch for connecting and disconnecting the worm wheel from the main shaft, consists of a clutch ring 16 (Figs. 1 and 25) adapted to slide on the hub of the worm wheel 12. A plurality of pins 17 are secured in the ring 16 by cap screws 18 or other means, and are adapted to slide through holes in the gear and into corresponding holes in the bushing 13 when the clutch ring is in the position shown in Fig. 25. When the clutch ring is slid downward from the position shown in Fig. 25, the pins 17 clear the bushing and permit the gear to rotate without driving the bushing and the main shaft keyed therein. A suitable forked handle 19 has pins 20 fitting in the groove 21 of the clutch ring to move it into the "on" or "off" position as desired. The housing 21' in Fig. 2 is not shown in Fig. 1 in order to illustrate the gear and clutch arrangement.

The lathe head 3 (Fig. 1) has a housing 22 secured to it, which is adapted to receive a split bushing 23 threaded on the interior with threads of the pitch desired in the threaded connection to be cut in the electrode section. These threaded sections are secured in the housing 22 by cap screws 24 or other suitable means. Pointed set screws 25 are threaded through the housing and are adapted to press in the joint between the two sections of the threaded bushing to spread these outward against the housing. The bushing 23 can be taken out by removing cap screws 24 and loosening set screws 25, and pulling it to the left in Figs. 1 and 2. Inasmuch as the bushing is in two sections, it can then be readily taken off of the lathe. A stock of bushing having threads of various pitches, either double or single thread, will be provided so that any desired pitch of thread can be cut in the electrodes.

A collar 26 (Figs. 2, 19 and 20) is secured to main drive shaft 6 by transverse bolt 27 or other means. As shown in the drawing, this collar is partially split at 28 to permit the clamping action referred to. The collar has guides 29 secured to it to receive the followers 30 (Figs. 21, 22 and 23) which are adapted to fit in the threads of the split bushing 23 and cause the main drive shaft 6 to move longitudinally through the head stock when it is rotated. To permit the removal and adjustment of the threaded followers 30, a bolt 31 having an eccentric head 32 (Fig. 24) passes through the collar 26. When the followers are in position in the collar 26 the guides 29 fit into slots 33. The eccentric heads 32 of the bolt 31 fit in the cavities 34, while the bolts pass through the slot 35. A collar 36 (Fig. 2) is keyed to the bolt 31 to permit the rotation of the bolt by a spanner wrench or by any other suitable means. When the threaded follower has been adjusted into the threaded bushing 23 by rotating the bolt 31, the latter is clamped in position by nuts 37.

A split collar 38 is secured to the shaft at the left hand end (Fig. 2) to provide for the automatic stopping of the lathe. The collar is clamped to the shaft by means of suitable bolts 39 and carries a circular disk 40 adapted to abut against limit stops 41 or 42 secured to rod 43. Further description of the limit stop arrangement will be given later.

The main drive shaft (Fig. 18) has a central bore 44 extending from the left hand end as shown. In the extreme left hand end is secured a threaded bushing 45 adapted to receive the feed screw 46. The bushing is preferably threaded in shaft 6 and is further secured thereto by cap screws 47 which pass through the flange on the bushing and thread into the shaft.

Referring now to Fig. 2, a feed wheel 48 is secured on the feed screw 46, preferably by threading it thereon and locking it from rotation when adjusted in the desired place, by a suitable feather or key. A thrust bearing 51 (Fig. 1) is secured to the yoke 50 and takes up the thrusts when boring or threading. A hand wheel 49 is keyed or otherwise secured to the extreme left hand end of the shaft and provides for hand rotation of the feed screw.

Referring to Figs. 13 and 14, the boring head 8 has a flange 52 with a plurality of rabbeted portions 53, while the other end of the head has a T-shaped projection 54 provided with a slot 55 to receive cutting tools 9 and 10, and a transverse slot 56 to receive pilot tool 11. (Fig. 1). The cutting tools 9 and 10 can be held in place by any means, but I have shown taper headed bolts 57 (Fig. 15) adapted to pass through holes 58, which will tightly grip the tools in place on tightening the nuts against the under shoulder of the T projection 54.

The face plate 7 has a slide 59 (Figs. 9 and 10) held in place by guides 60 (Figs. 7 and 8) which are secured to the face plate by means of suitable screws 61. A second slide 62 (Figs. 11 and 12) fits in a dovetail slot 63 in the face plate and has lugs 64 which fit into a slot 65 on the under side of slide 59, so that the two slides must move together. A slide nut 66 is secured in hole 67 of slide 62 and is adapted to receive the adjusting worm or screw 68 (Fig. 7) which is rotated by means of handle 69 to produce movement of the two slides 59 and 62 in the face plate.

The slide 59 is recessed at 70 to receive the center of the flange 52 of the boring head. The boring head is clamped in position and held from turning by four dogs 71 which are rabbeted on the under side to fit into the rabbeted portions 53 of the boring head flange (Fig. 13). The dogs 71 have a lug 72 on the under side near the opposite end, which acts as the fulcrum to provide for proper gripping of the boring head flange when cap screws 73 are screwed into position through the dogs into the slide.

The boring head, secured to slide 59, is centered for boring by rotating handle 69 until it abuts against the set screw 74 threaded into an upstanding plug 75 secured in the face plate. Also, the boring head can be locked in any desired position by screwing down cap screw 76 which passes through a slot 77 in slide 59 and is threaded into the face plate.

The face plate (Figs. 1, 7 and 8) has a facing tool 78 for facing off the end of the electrode section at the finish of the boring operation. This facing tool is wedged into a clamp 79 by means of a sliding wedge 80 which can be adjusted by screw 81. Clamp 79 is secured to one of the slides 60 by a flat head machine screw 82 and to the face plate directly by cap screws 83 which pass through the face plate and thread into the clamp. A spacer 84 of the same thickness as guides 60 properly positions the clamp.

The electrode sections can be held in position on the lathe by any sort of clamp, but I have illustrated a suitable one in Fig. 4. This holder consists of an upper part 85 hinged to a base 86 which fits on the outer V guides 87 of the lathe bed and can be clamped in position on the bed by some means such as bolts 88 (Fig. 1). The holder is I-shaped in cross section and has a plurality of threaded holes 89 to receive screws 90 which press against bars 91 to clamp the electrode section in position. The upper part of the holder is hinged at 92 to permit the insertion of the electrode, and the other ends of the holders are held in place by a suitable bolt 93 (Fig. 1).

To accommodate electrodes smaller than can be clamped by the holder just described, a plurality of bushings of various sizes are provided. A suitable split bushing 94 is shown in Fig. 5. This is preferably made with an I beam cross section and is machined to fit in the holders 85, 86. To aline it properly a feather 95 is formed on it to fit in a correspondingly shaped groove 96 on the inside of the holders. The bushing is also secured to the holder by cap screws passing through holes 96' in the holder and threaded into holes of the bushing. When this bushing is in position the electrode may be clamped in it by the T bar 97 which fits in holes 98 (Figs. 5 and 6). These bars are forced against the electrode by screwing down screws 90 which abut against them.

It will be understood that there are two electrode holders clamped in position on the lathe bed, so as to hold the electrode section in a secure horizontal position.

The electric motor 14 previously referred to, is provided with speed adjusting means 99 which may be controlled by hand wheel 100. Since this speed adjusting means, *per se*, forms no part of the invention, further description of it is unnecessary.

The electric motor can be started in either direction by means of a rheostat arrangement 101 (Fig. 2) by throwing the handle 102 to either the right or the left as the case may be. The rheostat is held in either position by spring pressed dogs 103 whose ends 104 snap into depressions 105 in the movable part of the rheostat. The rheostat is brought back by a flexible cable 106 which is secured at one end to the movable member of the rheostat and at the other to a suitable weight 107 in the housing 108. A spring 109 may be placed in position to arrest the weight in the desired lower position.

To provide for automatic stopping of the lathe when the desired amount of boring or threading has been done, a rod 43 is arranged with collars 110 having projections 111 adapted to abut against the dogs 103 when pulled in either one direction or the other. When limit stops 41 or 42 strike the plate 40, rod 43 will be carried along to operate the dogs. The limit stops are adjustably secured to rod 43 so that the lathe can be arranged to stop in any desired position.

To permit of automatic feeding of the main shaft 6 through the bearings of the head for threading purposes, the wheel 48 can be locked from rotation or held by the operator by pushing in a key 112 through the side members of the lathe head until it fits into notches 113 in wheel 48.

A brief description of the operation of the lathe will now be given. As previously described, the lathe is provided with two head stocks and boring arrangements of identical construction. To simplify matters, only one of these has been shown on the drawing and accordingly the operation of only one of them will be described, though it will be understood that a similar operation will be going on at the same time at the right hand end of the lathe by the boring arrangement not shown. The electrode section is clamped in the electrode holders 85 and 86 (Fig. 4) with the use of proper sized bushings 94 if the electrode will not fit directly in the holders. Boring tools 9 and 10, together with pilot tool 11, are clamped in position in the boring head 8 which is centered by rotating handle 69 until the slide abuts against stop 74 (Fig. 7). Facing tool 78 is also clamped in position by means of clamping screw 81. The electric motor is then started by throwing the rheostat lever to the left hand position (Fig. 2) until projection 104 of the dog drops into notch 105. The main shaft and the attached face plate 7 then rotate to bore a hole in the electrode. Automatic feeding of the main shaft through the head stock by means of the thread feeding device is prevented by withdrawing the thread followers from mesh with the threads in the main bushing by rotating cam bolt 31 by means of a spanner wrench fitted onto collar 36 as previously described. To feed the shaft automatically while boring, the operator holds wheel 48 or the slide 112 (Figs. 1 and 2) is pushed in until it enters the notches 113. This prevents rotation of the feed shaft 46 which is keyed to the wheel 48. Therefore, as the main shaft 6 is rotated by the motor, it is fed to the right on account of the threaded connection (Fig. 18) between it and the now stationary feed shaft 46. The boring head is thus fed automatically into the electrode and after a certain depth is reached, the facing tool 78 commences to face off the end of the section. The operator will stop the boring action when a smooth face has been obtained which can be accomplished by either pushing the limit stop rod 43 to operate trip dog 103 and open the circuit of the motor, or the feeding action only can be stopped by pulling out key 112. Preferably the motor will be stopped and then reversed by throwing the handle 102 into the right hand position to withdraw the boring head from the electrode, after which it is stopped to permit the insertion of the recessing tool which is used to prevent jamming of the threading tool against the bottom of the hole in the electrode section. This is accomplished by a tool which is similar to the threading tool 9' shown in Fig. 17 excepting that it need not have the curved contour of the threads, although the threading tool itself could be used for recessing if desired. To accomplish the recessing of the electrode, both feeding devices on the lathe are thrown out of action when the recessing tool is in proper position at the bottom of the hole. It is then rotated by the motor, but not fed longitudinally into or out of the electrode. By rotating the handle 69 on the face plate slide the tool may be fed outward to produce the proper depth of recess. When the recess is formed the operator sets right hand limit stop 42 against disk 40 to provide automatic stopping of the lathe when threading the electrode, stop 41 being permanently adjusted to stop the lathe before the face plate binds against the head stock in the withdrawing operation.

The recessing tool is next removed and the proper shaped threading tool 9', such as is shown in Fig. 17, is inserted. This threading tool is clamped only on one side of the boring head, for instance in the slot shown occupied by tool 10 in Fig. 1. Having inserted the proper threaded bushing 23 to produce the desired pitch of the threads to be cut in the electrode section, the operator brings the followers 30 into engagement with the threads of the bushing by rotating cam bolt 31 in the opposite direction from that previously referred to. When the follower is in engagement with the bushing, cam bolt 31 is locked in position by screwing down the nuts 37.

The locking bar 112 is withdrawn from engagement with notches in feed wheel 48 and the electric motor started by throwing the rheostat lever 102 to the left. As the main shaft is rotated by the motor the stationary bushing 23 causes the automatic feeding of the threading tool into the electrode section on account of the threaded connection between it and the follower which is secured to the rotating shaft 6. When the bottom of the hole has been reached by the threading tool, rotating disk 40 abuts against limit stop 42 which has been previously set in position, and operate the rheostat trip as described above. The threading tool is fed inward by rotating the handle 69 so that it will clear the threads while it is being withdrawn, and then the motor is reversed by throwing the rheostat lever to the right. The motor will be automatically stopped by trip 41 engaging the rotating disk 40 secured to the main shaft, and after adjusting the threading tool outwardly by means of the handle 69 on the face plate slide, it will again be fed into the lathe to take a further cut. The time required for cutting the thread of course depends upon the amount of cut taken and this will be determined by the operator. When the thread feeding mechanism is in operation the wheel 48 is pulled away from the thrust bearing 51 as the pitch of threads on shaft 46 is less than those in the bushing 23. In other words, shaft 46 is automatically made inoperative when the thread feeding device is thrown into action.

A hand wheel 49 is keyed to the feed screw 46 to permit of hand feeding of the main shaft 6 if such is desired. If the wheel is held stationary the same rate of feed is obtained as when wheel 48 is locked to the frame. By letting the wheel 49 slip slowly through the hand, a slower rate of feed is obtained. Obviously both of the automatic feeding devices will be thrown out of operation when the hand feed is used.

The head stock of the lathe can be adjusted to various positions on the lathe bed by means of the usual pinion and rack arrangement 114 which need not be described in detail as this is similar to the rack arrangement usually employed on lathes for moving the tool supports.

Having described my invention, what I claim is:—

1. In lathes for boring and threading electrodes, a lathe bed, a head thereon, a main shaft slidably arranged in said head, a gear splined to said shaft, means for rotating said gear, a housing outside of said shaft secured to said head and having threads on the interior, a threaded follower secured to said shaft, means for moving said follower into and out of engagement with the threads of said housing, a second shaft threaded into the first mentioned shaft, a feed wheel threaded on said second mentioned shaft and rotatably secured in said head and means for preventing longitudinal movement of said feed wheel.

2. In lathes for boring and threading electrodes, a lathe bed, a head thereon, a main shaft slidably arranged in said head, a gear splined to said shaft, means for rotating said gear, a housing outside of said shaft secured to said head and having threads on the interior, a threaded follower secured to said shaft, means for moving said follower into and out of engagement with the threads of said housing, a second shaft threaded into the first mentioned shaft, a feed wheel threaded on said second mentioned shaft and rotatably secured in said head, means for preventing longitudinal movement of said feed wheel and means for locking said feed wheel from rotary movement.

3. In lathes for boring and threading electrodes, a lathe bed, a head thereon, a main shaft slidably arranged in said head, a gear splined to said shaft, means for rotating said gear, a housing outside of said shaft secured to said head, an internally threaded bushing secured in said housing, a threaded follower secured to said shaft, means for moving said follower into and out of engagement with the threads of said bushing, a second shaft threaded into the first mentioned shaft, a feed wheel threaded on said second mentioned shaft and rotatably secured in said head, means for preventing the longitudinal movement of said feed wheel and means for locking said feed wheel from rotary movement.

4. In lathes for boring and threading electrodes, a lathe bed, a head thereon, a main shaft slidably arranged in said head, a gear splined to said shaft, means for rotating said gear, a housing outside of said shaft and secured to said head, an internally threaded bushing secured in said housing, a threaded follower secured to said shaft, means for moving said follower into and out of engagement with the threads of said bushing, a second shaft threaded into the first mentioned shaft, a feed wheel threaded on said second mentioned shaft and rotatably secured in said head, means for preventing longitudinal movement of said feed wheel, means for locking said feed wheel from rotary movement, a power stopping device slidably arranged in said head, limit stops spaced apart on said device and means secured to said first mentioned shaft adapted to engage said stops at its limits of movement.

5. In lathes for boring and threading electrodes, a lathe head, a shaft journaled in said head, a bushing splined to said shaft adapted to permit the shaft to move longitudinally therethrough, thrust bearings in said head on each side of said bushing, a gear wheel journaled on said bushing, a clutch adapted to bring the gear into operative engagement with said bushing to rotate the shaft and bushing, and means for operating said clutch.

6. In lathes for boring and threading electrodes, a lathe head, a shaft journaled in said head, a bushing splined to said shaft and having a flange at one side, said bushing being adapted to permit the shaft to move longitudinlly therethrough, thrust bearings in said head on each side of said bushing, a gear wheel journaled on said bushing, a clutch ring adapted to be adjusted on said gear wheel, clutch pins secured to said ring and extending through said wheel, and means for adjusting said ring to move said pins into and out of engagement with the flange of said bushing to rotate the shaft and bushing.

In testimony whereof, I hereunto affix my signature.

WILLIAM SHAW.

Copies of this patent may be obtained for five cents each, by addressing the "Commissioner of Patents, Washington, D. C."